(12) United States Patent
Saotome

(10) Patent No.: US 7,290,171 B2
(45) Date of Patent: Oct. 30, 2007

(54) DEVICE DRIVER AND DEVICE

(75) Inventor: Makoto Saotome, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 10/291,540

(22) Filed: Nov. 12, 2002

(65) Prior Publication Data
US 2004/0078498 A1    Apr. 22, 2004

(30) Foreign Application Priority Data
May 16, 2002    (JP) .............................. 2002-141779

(51) Int. Cl.
*G06F 11/00* (2006.01)
(52) U.S. Cl. ..................... 714/22; 713/324; 713/340
(58) Field of Classification Search ................. 714/22; 713/324, 340
See application file for complete search history.

(56) References Cited

U.S. PATENT DOCUMENTS

| | | | |
|---|---|---|---|
| 5,745,670 A * | 4/1998 | Linde ........................... | 714/22 |
| 6,067,628 A * | 5/2000 | Krithivas et al. ............ | 713/340 |
| 6,541,879 B1 * | 4/2003 | Wright ......................... | 307/31 |
| 6,665,801 B1 * | 12/2003 | Weiss .......................... | 713/300 |
| 6,810,481 B1 * | 10/2004 | Kawade et al. ............. | 713/300 |
| 6,845,422 B2 * | 1/2005 | Shimada et al. ............ | 710/305 |
| 7,017,055 B1 * | 3/2006 | Ho .............................. | 713/300 |
| 7,069,347 B1 * | 6/2006 | Kolokowsky .................. | 710/8 |
| 2003/0070103 A1 * | 4/2003 | Kim ............................ | 713/300 |

FOREIGN PATENT DOCUMENTS

| | | |
|---|---|---|
| JP | HEI 11-316625 | 11/1999 |
| JP | 2001-34370 | 2/2001 |

OTHER PUBLICATIONS

Chapter 10. Universal Serial Bus Specification Revision 2.0.*

* cited by examiner

*Primary Examiner*—Yolanda L Wilson
(74) *Attorney, Agent, or Firm*—Staas & Halsey LLP (57) ABSTRACT

A device connected to a bus and a device driver for controlling the device, capable of preventing the device from falling into a forced use suspension (disable) state. Prior to notice of power consumption by a USB device connected to the bus(USB), the device driver acquires knowledge of remaining electric power that can be supplied by the bus. According to whether the remaining electric power is satisfactory for power consumption expected to be notified of by the USB device, the device driver permits the notice of power consumption by the USB device and causes the bus to start electric power supply, or executes avoidance processing in order to avoid shortage of power.

14 Claims, 9 Drawing Sheets

| | STANDARD REQUEST | CONTENT |
|---|---|---|
| 0 | GET_DTATUS | ACQUIRE STATUS |
| 1 | CLEAR_FEATURE | CLEAR OR DISABLE SPECIFIC FUNCTION |
| 3 | SET_FEATURE | SET OR ENABLE SPECIFIC FUNCTION |
| 5 | SET_ADDRESS | SET DEVICE ADDRESS |
| 6 | GET_DESCRIPTOR | ACQUIRE SPECIFIED DESCRIPTOR |
| 7 | SET_DESCRIPTOR | SET SPECIFIED DESCRIPTOR |
| 8 | GET_CONFIGURATION | ACQUIRE CURRENT DEVICE CONFIGURATION VALUE |
| 9 | SET_CONFIGURATION | SET DEVICE CONFIGURATION |
| 10 | GET_INTERFACE | ACQUIRE INTERFACE |
| 11 | SET_INTERFACE | SET INTERFACE |
| 12 | SYNCH_FRAME | TRANSMIT SYNCHRONIZING FRAME TO END POINT |

DEVICE DRIVER AND DEVICE

BACKGROUND OF THE INVENTION

1. Field of the Invention

The present invention relates to a device driver for controlling a device connected to a bus, and a device supplied with electric power from the bus.

2. Description of Related Art

Conventionally, a bus for connecting a peripheral device is provided in a main body of a personal computer or the like. A device driver for controlling the peripheral device connected to the bus is incorporated in the main body. Furthermore, in recent years, a universal serial bus (hereafter referred to as USB) has become a standard interface of personal computers.

A plurality of devices (hereafter referred to as USB devices) can be connected to the USB. In low power USB devices among such USB devices, devices (bus power device) supplied with electric power from the USB also exist.

As the USB spreads, however, the proportion of USB devices to devices connected to personal computers is increasing. The number of USB devices connected to each personal computer is also increasing. In some cases, therefore, the total power consumption of a USB device exceeds permissible supplied electric power of the USB provided in the personal computer. In such a case, in order to avoid imposing an abnormal load on the personal computer, there is adopted in the USB a scheme in which each USB device is caused to notify the bus of power consumption beforehand and the USB device is brought into a forced use suspension (disable) state when its power consumption cannot be satisfied with the permissible supplied electric power.

Recently, however, USB devices are being adopted in devices each having a battery, such as portable telephones, as well. In such a USB device having a battery, not only electric power for operation of an electronic circuit but also electric power for charging the battery is supplied from the USB. Such a USB device causing largely different power consumption at the time of operation and having a plurality of functions typically notifies the bus side of power consumption in a function causing the greatest power consumption. Even in the case where only the operation of the electronic circuit is necessary, therefore, the USB device requests more electric power than is necessary from the host, often resulting in the forced use suspension (disable) state.

There is also a USB device of such in which power consumption is switched from function to function and a notice to that effect is sent to the bus side. When switching to a function causing large power consumption is effected, however, the USB device falls into a forced use suspension (disable) state in some cases.

Once the USB device falls into such a forced use suspension (disable) state, thereafter the USB device cannot be used at all, unless reconnection of the USB device is conducted. Therefore, it becomes necessary for the user to operate the USB device carefully so as to prevent the USB device from falling into the forced use suspension (disable) state, resulting in a troublesome operation.

This problem occurs not only in USB buses but also in arbitrary buses each capable of being connected to a plurality of devices and supplying electric power to the devices.

SUMMARY OF THE INVENTION

In view of the above described circumstances, an object of the present invention is to provide a device driver and a device capable of easily preventing the device from falling into the forced use suspension (disable) state.

A device driver according to the present invention that achieves the object is a device driver for controlling devices of recipient type connected to a bus capable of being connected to a plurality of devices and supplying electric power to the connected devices, each of the devices notifying the bus of power consumption and being supplied with electric power, the device driver including: a remaining power knowledge acquisition section for acquiring knowledge of remaining electric power that can be supplied by the bus, prior to notice of power consumption by a device of recipient type connected to the bus; and an electric power supply control section for permitting the notice of power consumption by the device of recipient type and causing the bus to start electric power supply, or executing avoidance processing in order to avoid shortage of power, according to whether the remaining electric power the knowledge of which has been acquired by the remaining power knowledge acquisition section is satisfactory for power consumption expected to be notified of by the device of recipient type.

Herein, "power consumption expected to be notified of" may be the one stored in the device of recipient type, or may be incorporated in the device driver itself beforehand.

In the device driver of the present invention, "as the avoidance processing, the electric power supply control section may cause a predetermined display device to display a warning message, prior to the notice of power consumption by the device of recipient type, and wait for a predetermined start operation in order to permit the notice of power consumption and cause the bus to start electric power supply", and "as the avoidance processing, the electric power supply control section may cause the device of recipient type to send a notice of power consumption satisfied by the remaining electric power and cause the device of recipient type to operate within the power consumption of the notice."

In the case of the avoidance processing of displaying a warning message and waiting for a start operation, the user of the device of recipient type can recognize that the remaining power is insufficient by the warning message, and avoid the forced use suspension (disable) state by disconnecting another unnecessary device from the bus to ensure power and then conducting start operation.

In the case of the avoidance processing of causing the device of recipient type to send a notice of power consumption satisfied by the remaining electric power, the forced use suspension (disable) state can be avoided automatically.

The device driver of the present invention may have such a format that "the remaining power knowledge acquisition section acquires knowledge of remaining electric power when the device of recipient type is connected to the bus" and may have such a format that "the device of recipient type has a plurality of operation modes differing from each other in power consumption, and newly notifies the bus of power consumption when the operation mode is altered, and the remaining power knowledge acquisition section acquires knowledge of remaining electric power when the operation mode of the device of recipient type is altered."

Preferably, in the device driver of the present invention, "the device of recipient type has a plurality of operation modes differing from each other in power consumption, and the electric power supply control section causes the device of recipient type to notify the bus of maximum power consumption, when the remaining electric power the knowledge of which has been acquired by the remaining power knowledge acquisition section is satisfactory for maximum power consumption among power consumption values respectively of the plurality of operation modes." According to the device driver of such a form, power for the device of recipient type is ensured at the time when the remaining power is sufficiently large. Whichever mode is selected thereafter, therefore, the forced use suspension (disable) state is avoided.

The device driver of the present invention may have such a form that "the device of recipient type stores a plurality of power consumption values to notify the bus of the plurality of power consumption values, and the electric power supply control section selects one of the plurality of power consumption values stored in the device of recipient type and thereby causes the device of recipient type to notify the bus of the selected power consumption value." In a preferred form, however, "the device of recipient type rewritably stores the power consumption values to notify the bus of the power consumption values and the electric power supply control section rewrites the power consumption values stored in the device of recipient type and thereby causes the device of recipient type to notify the bus of the rewritten power consumption values". According to the device driver of such a form, memory elements to be prepared in the device of recipient type can be held down and the cost of the device of recipient type can be held down.

A device according to the present invention that achieves the object is a device connected to a bus and supplied with electric power from the bus by notifying the bus of power consumption, the device including: a power control section responsive to the power consumption being excessive as compared with a supply capability of the bus, for shifting the device to an operation state in which the device operates with reduced power consumption as compared with the excessive power consumption; and a power notice section responsive to a shift to the operation state, for notifying the bus of power consumption in the operation state.

According to the device of the present invention, the operation state is shifted when power consumption has exceeded the supply capability of the bus, and the power consumption is reduced, whereby the forced use suspension (disable) state is avoided.

According to the device driver and devices of the present invention, it becomes possible to easily avoid the forced use suspension (disable) state and keep the devices always operating as heretofore described.

DESCRIPTION OF THE PREFERRED EMBODIMENTS

Hereafter, embodiments of the present invention will be described.

Figure 1:
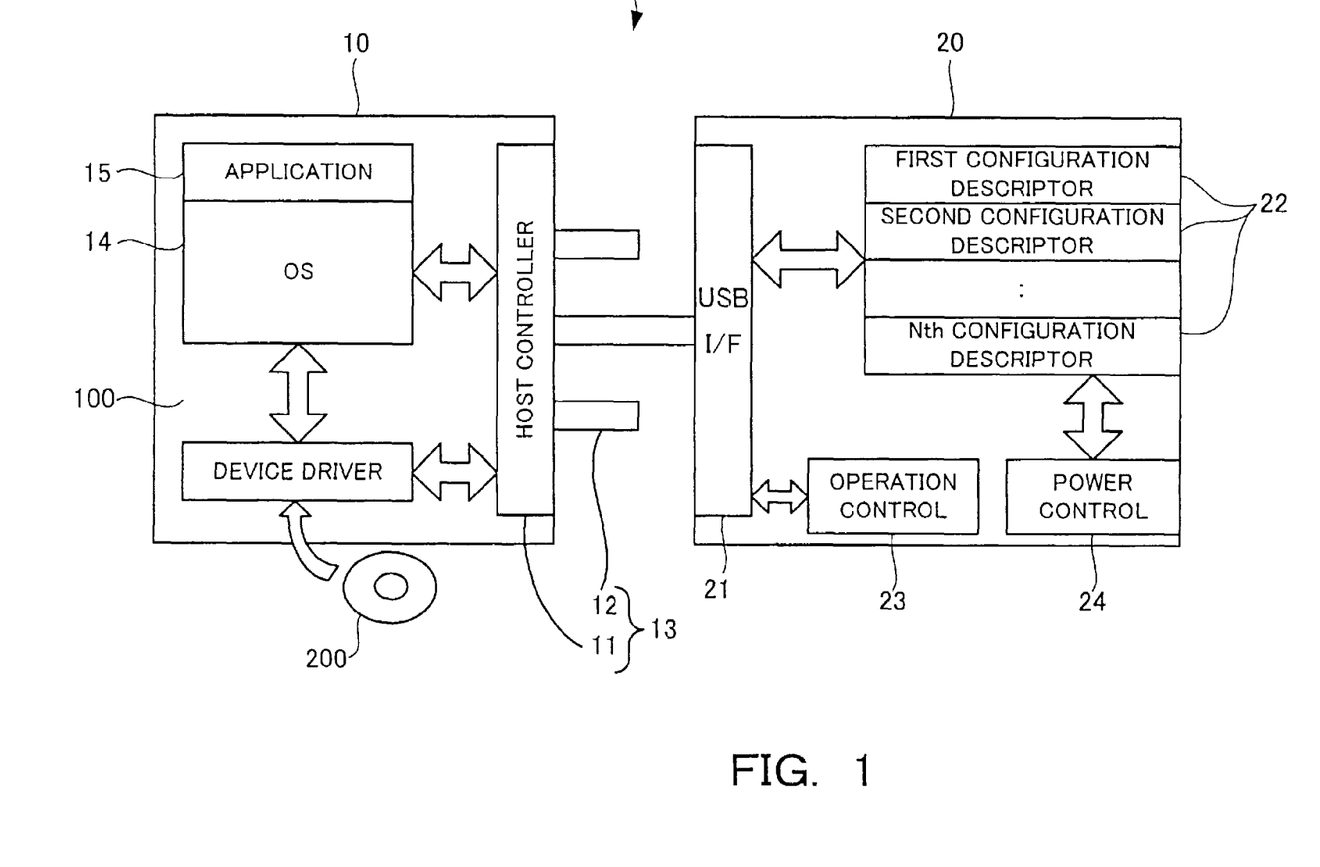
FIG. 1 is a diagram showing a computer system to which an embodiment of a device driver according to the present invention is applied.

FIG. 1 is a diagram showing a computer system to which an embodiment of a device driver according to the present invention is applied.

A computer system 1 having a computer main body 10 and a USB device 20 is shown in FIG. 1. The computer system 1 includes a display, which is not illustrated.

The computer main body 10 includes a USB 13. The USB 13 includes a host controller 11 and three bus lines 12 controlled by the host controller 11. Each of the bus lines 12 consists of a connector and a cable. The USB device 20 is connected to one of the bus lines 12 of the USB 13 via a USB_I/F 21. The USB device 20 is an example of a device referred in the present invention to as device of recipient type, and it is supplied with electric power from the USB 13. By branching three bus lines 12, a maximum of 127 devices can be connected to the USB 13. The USB 13 can supply electric power to a plurality of devices of recipient type so long as it dose not exceed a predetermined upper power limit.

There are installed in the computer main body 10 an OS (Operating System) 14 for conducting basic management on the whole computer system 1, an application 15 for making the computer system 1 as a device that performs a predetermined function, and a device driver 100 for the USB device 20 for controlling the USB device 20. The device driver 100 has been stored in a CD-ROM 200. The CD-ROM 200 is loaded on a CD drive, which is provided in the computer system 1 and which is not illustrated, and read into the computer main body 10 and installed therein. The device driver 100 is an embodiment of a device driver according to the present invention.

Figure 2:
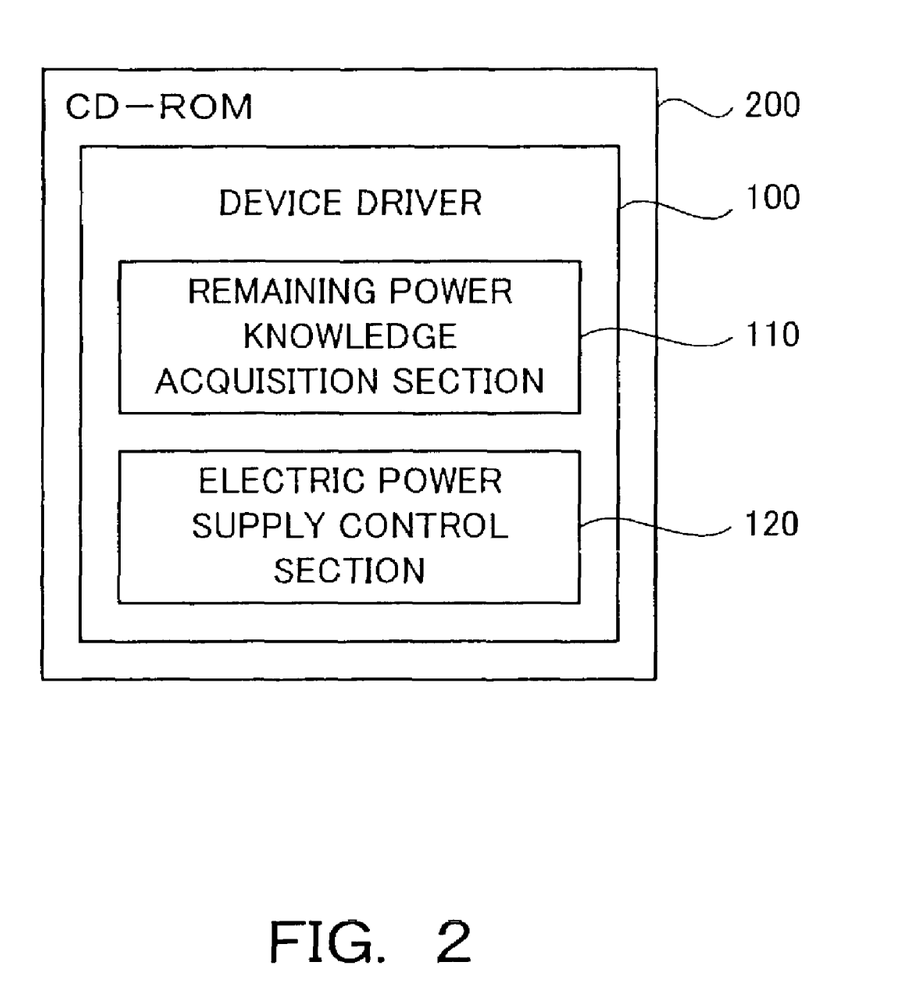
FIG. 2 is a diagram showing a configuration of a device driver.

FIG. 2 is a diagram showing a configuration of the device driver.

The configuration of the device driver 100 in such a state that it is stored in the CD-ROM 200 is shown in FIG. 2. The device driver 100 has the same configuration also in such a state that it is installed in the computer main body 10. The device driver 100 includes a remaining power knowledge acquisition section 110 and an electric power supply control section 120.

The remaining power knowledge acquisition section 110 acquires the knowledge of remaining power that can be supplied by the USB 13 shown in FIG. 1. The electric power supply control section 120 controls electric power supply to the USB device 20.

Referring back to FIG. 1, description will be continued.

N kinds of operation mode exist in the USB device 20. N memory elements each referred to as configuration descriptor 22 are included in the USB device 20. Operation environments (configurations) of the N kinds of operation modes are stored in the configuration descriptors 22, respectively. Details of storage contents of the configuration descriptors 22 will be described later.

The USB devices 20 further includes an operation control block 23 and a power control block 24. The operation control block 23 conducts like switching among the N kinds of operation mode or selection among the configuration descriptors 22 according to the operation mode. The power control block 24 conducts power control according to the operation environment stored in the selected configuration descriptor 22. The operation control block 23 is equivalent to an example of a section referred in the present invention to as power notice section. The power control block 24 is equivalent to an example of a section referred in the present invention to as power control section.

Figure 3:
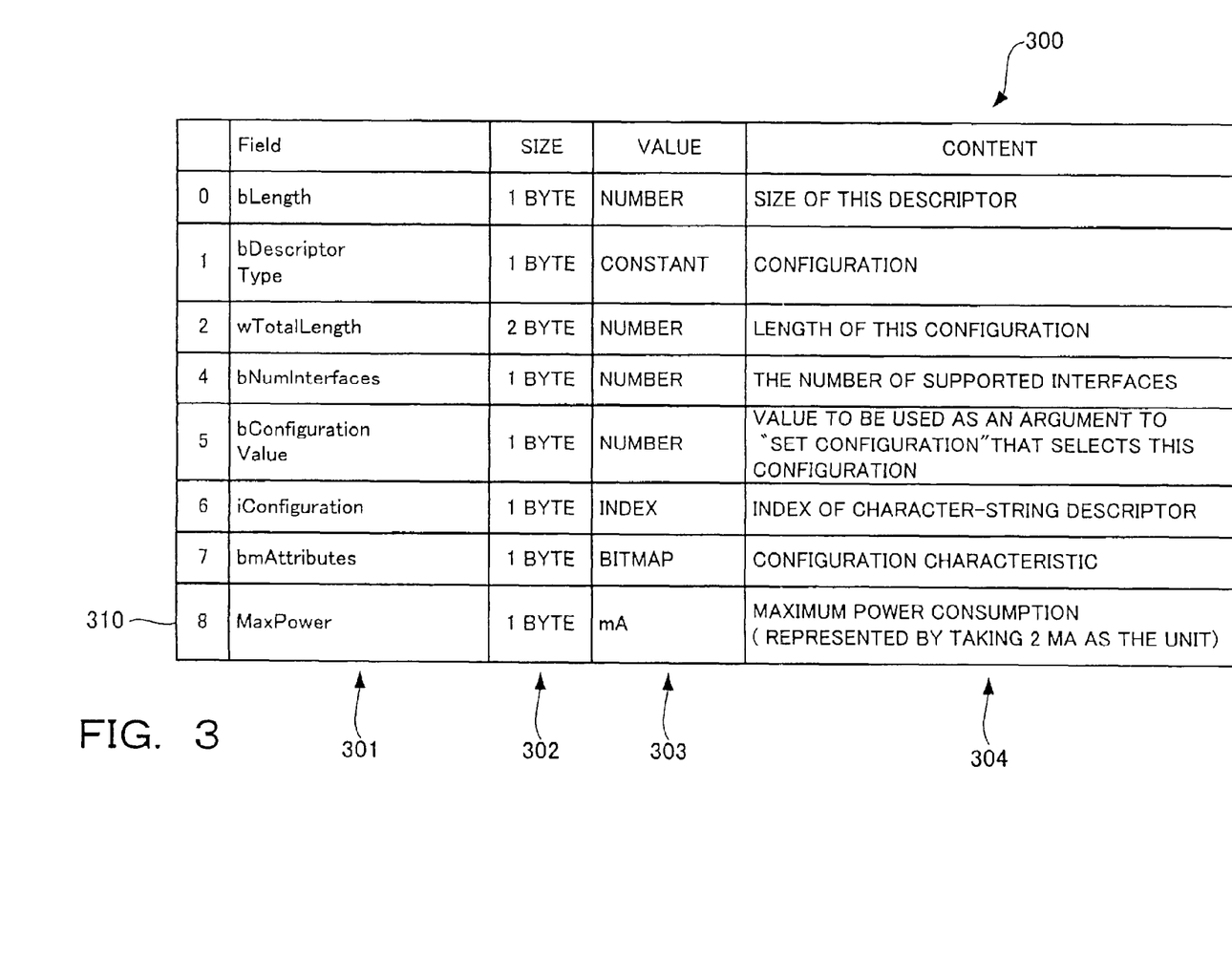
FIG. 3 is a diagram showing storage contents of a configuration descriptor 22.

FIG. 3 is a diagram showing storage contents of the configuration descriptor 22.

In FIG. 3, storage contents of the configuration descriptor are collectively shown in a configuration table 300. Nine fields ranging from a zeroth field to an eighth field are stored in the configuration descriptor. In the configuration table 300, a field name 301, a size 302, a field value 303, and a field storage content 304 are shown for each of the nine fields. Among the nine fields, an eighth field 310 is provided with a field name "Max Power" in which maximum power consumption in the pertinent operation mode is stored.

The USB 13 shown in FIG. 1 has an instruction (request) system. The device driver 100 controls the USB device 20 by using the instruction system.

In the instruction system, there are used thirteen standard requests prescribed in common irrespective of the kind of the USB device, one class request prescribed in common in each of classes obtained by classifying the USB device into some classes, and one vendor request which can be freely defined by a maker of the USB device.

Figure 4:
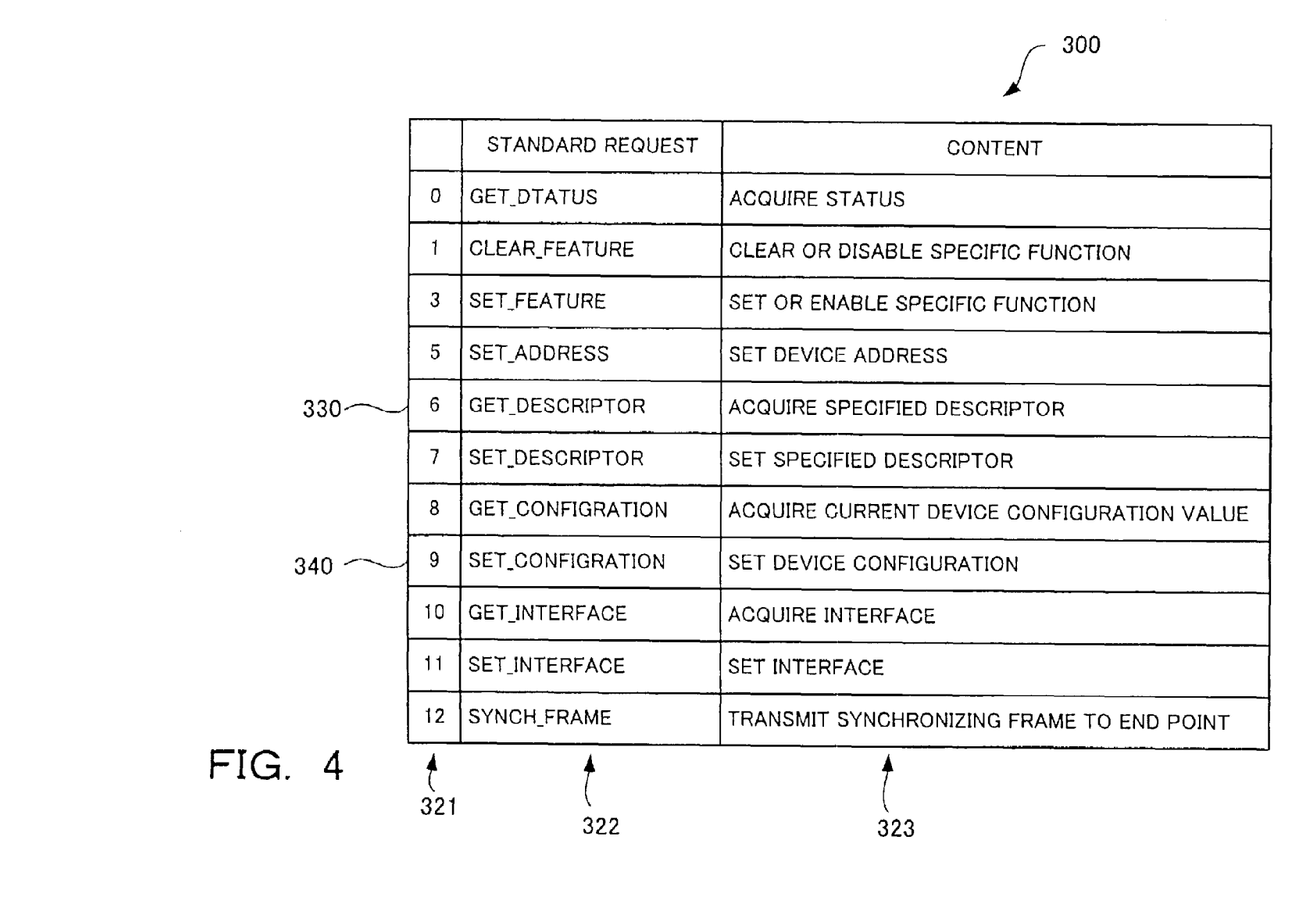
FIG. 4 is a diagram showing standard requests provided in a USB.

FIG. 4 is a diagram showing standard requests provided in the USB.

In FIG. 4, thirteen standard requests provided in the USB are collectively shown as a request table 320. In the request table 320, a request number 321, a request name 322, and a request content 323 are shown for each of the thirteen standard requests.

Among the thirteen standard requests shown in FIG. 4, a sixth request 330 and a ninth request 340 will be used in the ensuing description. The sixth request 330 has a request name "GET_DESCRIPTOR," and it is an instruction for acquiring a content stored in a configuration descriptor. The ninth request 340 has a request name "SET_CONFIGURATION," and it is an instruction for setting an operation environment (configuration) of a USB device by specifying a configuration descriptor.

Hereafter, a control operation procedure in a first embodiment of a device driver according to the present invention will be described. In the ensuing description, the components shown in FIG. 1 will be referred to as the occasion may demand.

Figure 5:
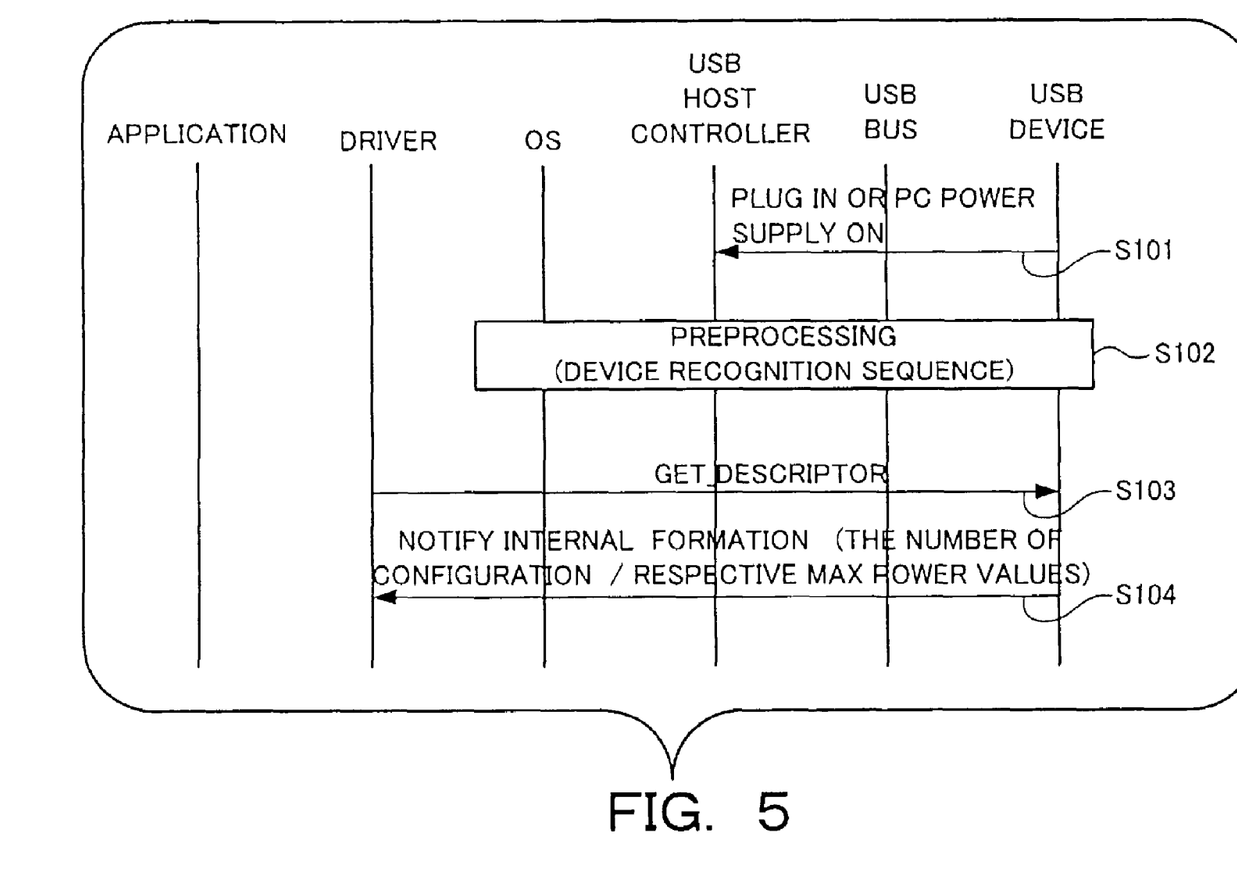
FIG. 5 is a diagram showing a former stage of a control operation procedure in a first embodiment.
Figure 6:
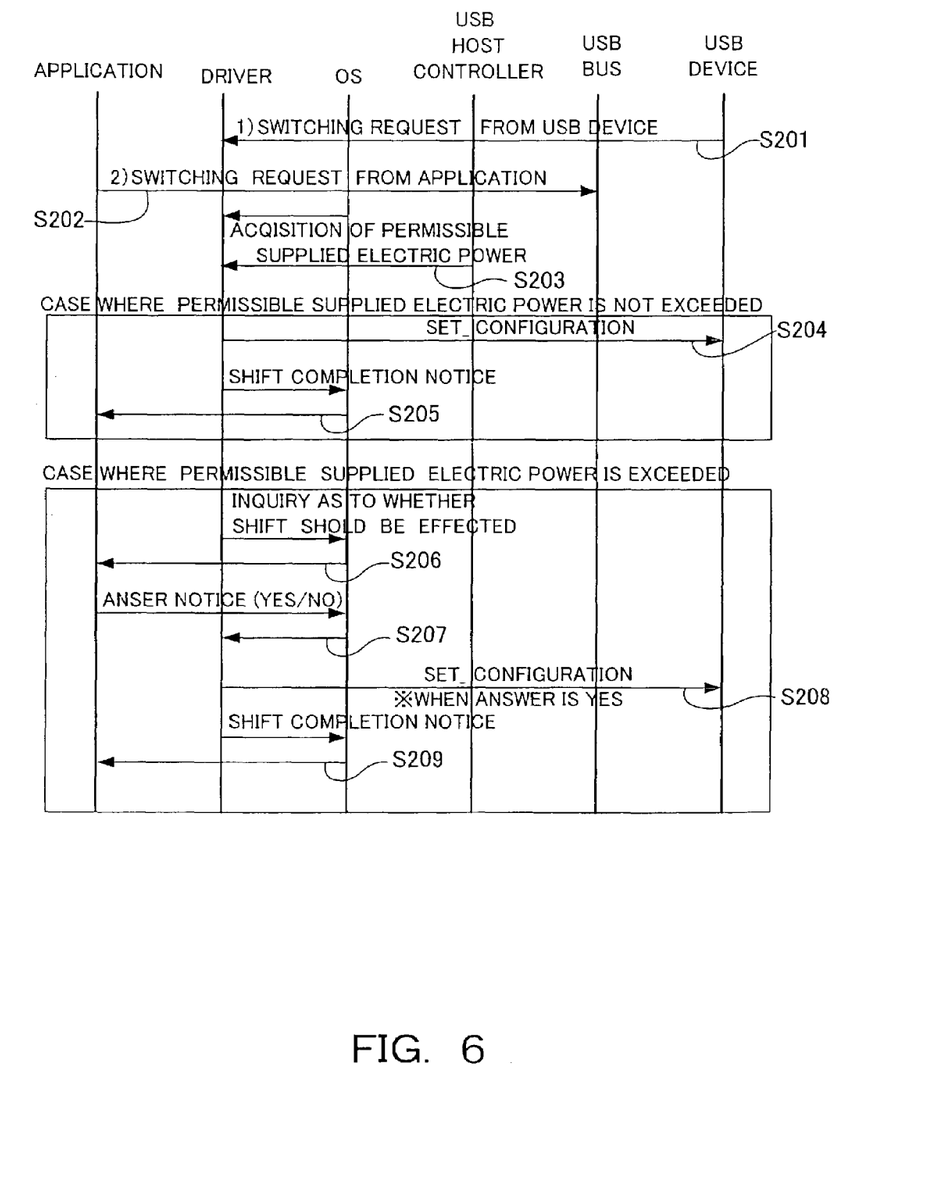
FIG. 6 is a diagram showing a latter stage of a control operation procedure in the first embodiment.

FIG. 5 is a diagram showing a former stage of the control operation procedure in the first embodiment. FIG. 6 is a diagram showing a latter stage of the control operation procedure in the first embodiment.

Control of the USB device 20 conducted by the device driver 100 is started when the power supply of the computer main body 10 has turned on or when the USB device 20 is connected to (plugged in) the USB 13. First, the USB device 20 sends a predetermined signal to the host controller 11 via the bus line 12 (step S101). Upon the signal serving as a trigger, preprocessing (step S102) for recognizing the USB device 20 is executed by an OS 14 and the like.

Upon termination of the preprocessing, the device driver 100 issues the request 330 "GET DESCRIPTOR" shown in FIG. 4 to the USB device 20 (step S103). The device driver 100 acquires the number of configuration descriptors 22 provided in the USB device 20 and a Max Power value stored in each configuration descriptor 22 from the USB device 20 (step S104). The Max Power value thus acquired is preserved in the computer main body 10 by the device driver 100.

After the procedure of the former stage is finished and the USB device is recognized, the procedure of the latter stage shown in FIG. 6 is started, when one operation mode is specified from among a plurality of operation modes the USB device 20 has and the operation mode is started, or when switching from one operation mode to another operation mode is conducted. Hereafter, these cases are collectively referred to simply as "operation mode switching."

The operation mode switching is caused by one of the following two requests. One of the two requests is a switching request from the USB device 20 (step S201). The other of the two requests is a switching request from the application 15 (step S202).

The switching request from the USB device 20 is sent from the operation control block 23 in the USB device 20 to the device driver 100 via the USB I/F 21, the bus line 12, and the USB host controller in order.

The switching request from the application 15 is sent from the application 15 in the computer main body 10 to the device driver 100 via the OS 14.

Upon receiving such a request, the remaining power knowledge acquisition section 110 (see FIG. 2) in the device driver 100 acquires the knowledge of the remaining power value that can be supplied (permissible supplied electric power value), from the host controller 11 via the OS 14 (step S203). Thereafter, the electric power supply control section 120 (see FIG. 2) in the device driver 100 determines whether the power consumption required for the operation mode after switching can be satisfied with the permissible supplied electric power value, on the basis of a Max Power value that is included in Max Power values acquired and preserved beforehand according to the procedure shown in FIG. 5 and that corresponds to the operation mode after the switching, and the permissible supplied electric power value acquired by the remaining power knowledge acquisition section 110. In other words, the electric power supply control section 120 determines whether the increase of the Max Power value caused by switching of the operation mode exceeds the permissible supplied electric power value.

If the increase of the Max Power value is judged not to exceed the permissible supplied electric power value (inclusive of the case where the Max Power value is decreased by the operation mode switching), then the device driver 100 issues the request "SET_CONFIGURATION" shown in FIG. 4 to the USB device 20 (step S204), and thereby shifts the USB device 20 to an operation environment (configuration) of a new operation mode. The USB device 20 shifted in operation environment notifies the OS 14 of the power consumption in the new operation environment via the host controller 11, and supplied with operation power from the USB 13. Furthermore, the device driver 100 notifies the application 15 that the operation mode shift (switching) has been completed, via the OS 14 (step S205).

On the other hand, if the electric power supply control section 120 judges the increase of the Max Power value to exceed the permissible supplied electric power value, then the device driver 100 inquires of the user whether the operation mode is to be shifted/or not to be shifted, via the OS 14 and the application 15 (step S206), and receives an answer notice representing "yes" (to be shifted)/ "no" (not to be shifted) (step S207). Upon receiving the inquiry, the user ensures electric power by, for example, disconnecting an extra USB device connected to the USB 13 and returns an answer notice representing "yes" (to be shifted), or gives up the switching to the new operation mode and returns an answer notice representing "no" (not to be shifted).

If an answer notice representing "no" (not to be shifted) is received, then the electric power supply control section 120 inhibits switching to the new operation mode. If the answer notice representing "yes" (to be shifted) is received, then the electric power supply control section 120 issues the request 340 "SET_CONFIGURATION" to the USB device 20 (step S208), and shifts the USB device 20 to the operation environment (configuration) of the new operation mode. In the same way as the foregoing description, the USB device 20 sends a notice of power consumption and is supplied with electric power. The device driver 100 sends a notice to the effect that the operation mode shift (switching) has been completed, to the application 15 via the OS 14 (step S209).

According to the first embodiment, the inquiry as to whether the operation mode shift should be conducted/not conducted is presented to the user before the device falls into the disable state. Therefore, it is possible to easily avoid the forced use suspension (disable) state if the user respond to it suitably.

A second embodiment of a device driver according to the present invention will now be described.

Except that, for example, the Nth configuration descriptor included in N configuration descriptors 22 shown in FIG. 1 is rewritable in Max Power value, the second embodiment is premised on a computer system equivalent to the computer system 1 shown in FIG. 1. Furthermore, the second embodiment has the same configuration as that shown in FIG. 2.

In the ensuing description, FIGS. 1 to 4 are diverted as diagrams concerning the second embodiment.

Figure 7:
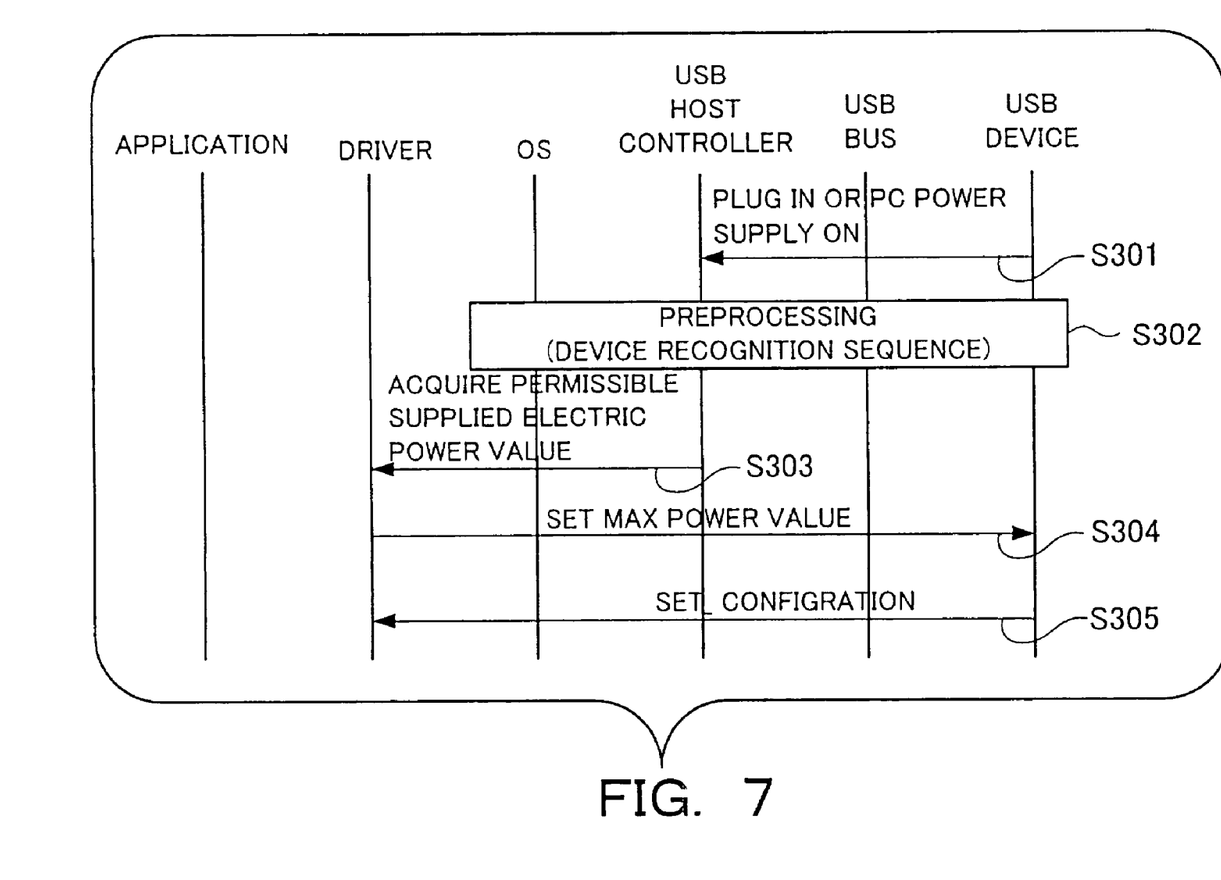
FIG. 7 is a diagram showing a control operation procedure in the second embodiment.

FIG. 7 is a diagram showing a control operation procedure in the second embodiment.

In the second embodiment as well, control of the USB device 20 conducted by the device driver 100 is started when the power supply of the computer main body 10 has turned on or when the USB device 20 is connected to (plugged in) the USB 13. First, the USB device 20 sends a predetermined signal to the host controller 11 via the bus line 12 (step S301). Upon the signal serving as a trigger, preprocessing (step S302) for recognizing the USB device 20 is executed by the OS 14.

Upon termination of the preprocessing, in the second embodiment, the remaining power knowledge acquisition section 110 (see FIG. 2) in the device driver 100 acquires the knowledge of the permissible supplied electric power value, from the OS 14. The permissible supplied electric power value is transmitted from the electric power supply control section 120 (see FIG. 2) in the device driver 100 to the Nth configuration descriptor 22 via the OS 14, the host controller 11, the bus line 12 and the USB I/F 21 in order, and set in the Nth configuration descriptor 22 as the Max Power value (step S304). Such setting of the Max Power value can be implemented by defining, for example, the above described vendor request.

Thereafter, by using the SET_CONFIGURATION request, the electric power supply control section 120 in the device driver 100 switches the operation environment of the USB device 20 to the operation environment stored in the Nth configuration descriptor 22 (step S305).

The power control block 24 in the USB device 20 conducts power control so that the Max Power value set in the switched operation environment will not be exceeded. For example, if the USB device 20 has a rechargeable battery supplied with charging power from the USB 13 and the permissible supplied electric power value is less than ordinary charging power, then the power control block 24 conducts power control to effect gradual charging within the set Max Power value (i.e., the permissible supplied electric power value).

According to the second embodiment, the forced use suspension (disable) state is automatically avoided.

If in the second embodiment the permissible supplied electric power value has a margin and it exceeds the maximum power consumption value consumed by the USB device 20 at the step S304, then the maximum power consumption value is set as the Max Power value. The maximum power consumption value is a value prepared in the device driver 100 beforehand.

Since the maximum power consumption value is thus set as the Max Power value, excessive power assignment is avoided and in addition thereafter the forced use suspension (disable) state is avoided no matter which mode the operation is switched to.

A third embodiment of a device driver according to the present invention will now be described.

Figure 8:
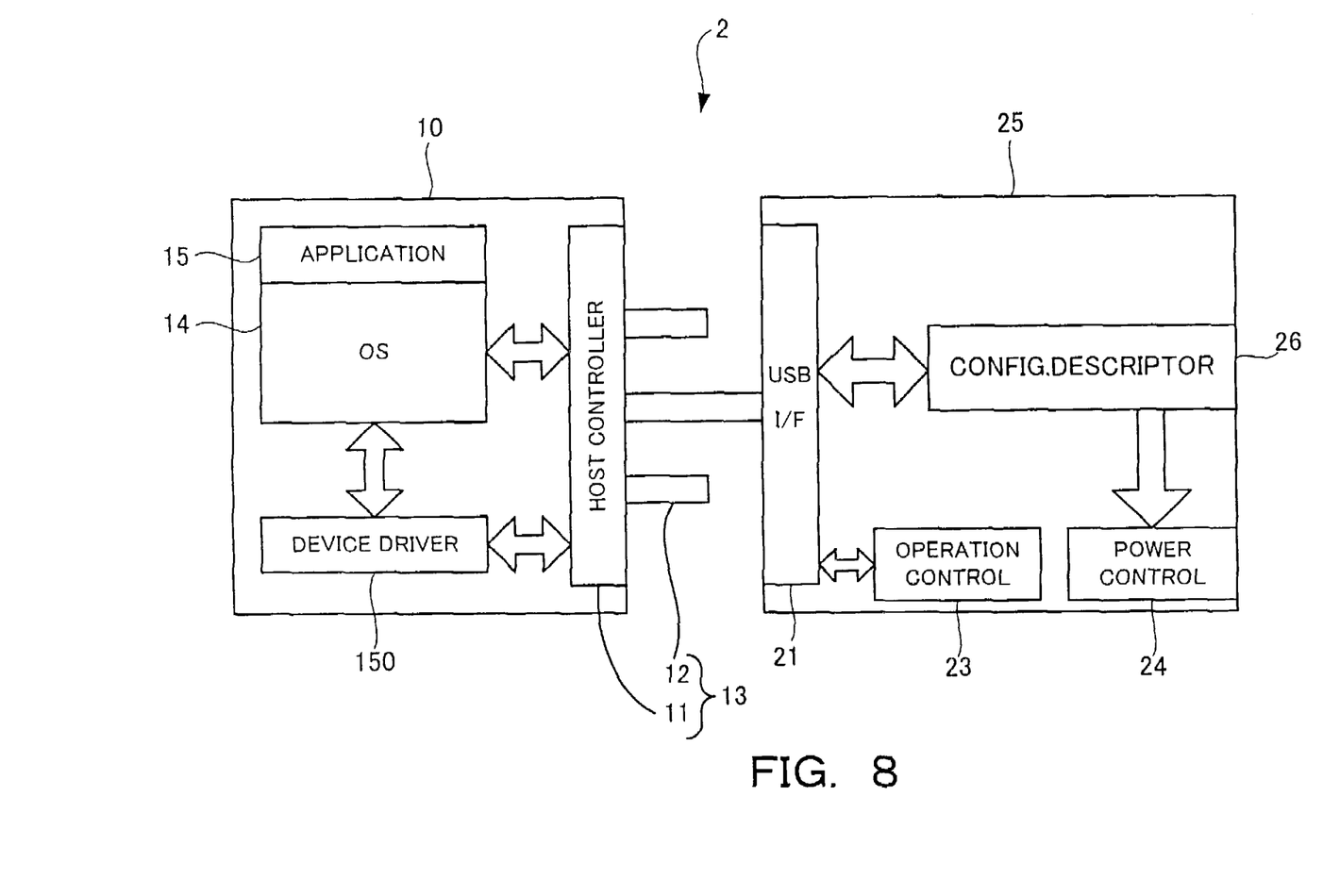
FIG. 8 is a diagram showing a computer system to which a third embodiment is applied.

FIG. 8 is a diagram showing a computer system to which the third embodiment is applied.

A computer system 2 shown in FIG. 8 is the same as the computer system 1 shown in FIG. 1 except that a USB device 25 having one configuration descriptor 26 in which the Max Power value can be rewritten is provided instead of the USB device 20 having N configuration descriptors 22 shown in FIG. 1 and a device driver 150 of the third embodiment is incorporated in the computer main body 10. The device driver 150 of the third embodiment has the same configuration as that of the device driver 100 shown in FIG. 2.

In the ensuing description, FIGS. 2 to 4 are diverted as diagrams concerning the third embodiment.

Figure 9:
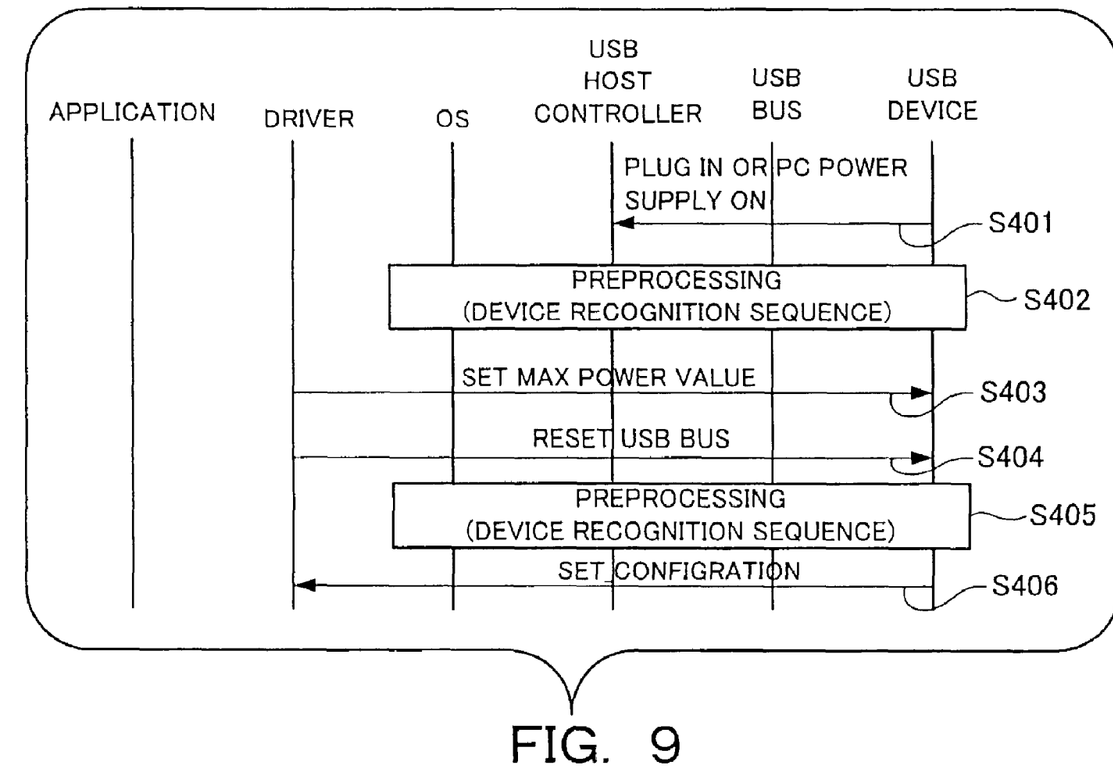
FIG. 9 is a diagram showing a control operation procedure in the third embodiment.

FIG. 9 is a diagram showing a control operation procedure in the third embodiment.

In the third embodiment as well, control of the USB device 20 conducted by the device driver 150 is started when the power supply of the computer main body 10 has turned on or when the USB device 20 is connected to (plugged in) the USB 13. First, the USB device 20 sends a predetermined signal to the host controller 11 via the bus line 12 (step S401). Upon the signal serving as a trigger, preprocessing (step S402) for recognizing the USB device 20 is executed by the OS 14 and the like.

Upon termination of the preprocessing, in the third embodiment as well, the remaining power knowledge acquisition section 110 (see FIG. 2) in the device driver 150 acquires the knowledge of the permissible supplied electric power value, from the OS 14 in the same way as the second embodiment. The permissible supplied electric power value is transmitted from the electric power supply control section 120 (see FIG. 2) in the device driver 150 to the configuration descriptor 26 via the OS 14, the host controller 11, the bus line 12 and the USB I/F 21. A Max Power value of the configuration descriptor 26 is thus set equal to the same value as the set value in the step S304 of the second embodiment.

Thereafter, in the third embodiment, the device driver 150 issues a USB bus reset signal via the OS 14 and the host controller 11 (step S404). The same preprocessing (step S405) as that in the foregoing description is executed, and the USB device 25 is recognized again. Thereafter, the electric power supply control section 120 in the device driver 150 sets the operation environment of the USB device 25 equal to the operation environment stored in the configuration descriptor 26 by using the SET_CONFIGURATION request (step S406).

According to the third embodiment, the same electric power supply control as that of the second embodiment can be implemented by using one configuration descriptor 26 alone. Thus, the cost of the USB device 25 can be suppressed.

By application in which the step S204 or S208 in the first embodiment is replaced with the procedure of the steps S403 to S406 in the third embodiment, the same electric power supply control as that in the first embodiment can also be implemented by using one configuration descriptor 26 alone.

What is claimed is:

1. A device driver stored on a computer readable medium for controlling devices of recipient type connected to a bus capable of being connected to a plurality of devices and supplying electric power to the connected devices, said device driver comprising:
   a remaining power knowledge acquisition section for acquiring knowledge of remaining electric power capacity of the bus prior to a notice of power consumption from the device of recipient type connected to the bus, the notice of power consumption identifying a consumption value to be used up by the device; and
   an electric power supply control section for acquiring a consumption value expected to be identified by the notice of power consumption from the device of the recipient type prior to said notice of power consumption, permitting the notice of power consumption by the device of recipient type and causing the bus to start electric power supply, or to start electric power supply by avoidance processing in order to avoid shortage of power, according to whether the remaining electric power acquired by said remaining power knowledge acquisition section is satisfactory for the consumption value expected to be identified by the notice of power consumption from the device of recipient type.

2. A device driver stored on a computer readable medium for controlling devices of recipient type connected t a bus capable of being connected to a plurality of devices and supplying electric power to the connected devices, each of the devices notifying the bus of power consumption and being supplied with electric power, said device driver comprising:
   a remaining power knowledge acquisition section for acquiring knowledge of remaining electric power that can be supplied by the bus, prior to notice of power consumption by a device of recipient type connected to the bus; and
   an electric power supply control section for permitting the notice of power consumption by the device of recipient type and causing the bus to start electric power supply, or executing avoidance processing in order to avoid shortage of power, according to whether the remaining electric power the knowledge of which has been acquired by said remaining power knowledge acquisition section is satisfactory for power consumption expected to be notified of by the device of recipient type, and
   wherein as the avoidance processing, said electric power supply control section causes a predetermined display device to display a warning message, prior to the notice of power consumption by the device of recipient type, and waits for a predetermined start operation in order to permit the notice of power consumption and cause the bus to start electric power supply.

3. The device driver according to claim 1, wherein as the avoidance processing, said electric power supply control section causes the device of recipient type to send a notice of power consumption satisfying the remaining electric power and causes the device of recipient type to operate within the power consumption of the notice.

4. The device driver according to claim 1, wherein said remaining power knowledge acquisition section acquires knowledge of remaining electric power when the device of recipient type is connected to the bus.

5. The device according to claim 1, wherein
   the device of recipient type has a plurality of operation modes differing from each other in power consumption, and newly notifies the bus of power consumption when the operation mode is altered, and
   said remaining power knowledge acquisition section acquires knowledge of remaining electric power when the operation mode of the device of recipient type is altered.

6. The device driver according to claim 1, wherein
   the device of recipient type has a plurality of operation modes differing from each other in power consumption, and
   said electric power supply control section causes the device of recipient type to notify the bus of maximum power consumption, when the remaining electric power the knowledge of which has been acquired by said remaining power knowledge acquisition section is satisfactory for maximum power consumption among power consumption values respectively of the plurality of operation modes.

7. The device driver according to claim 3, wherein
   the device of recipient type stores a plurality of power consumption values to notify the bus of the plurality of power consumption values, and
   said electric power supply control section selects one of the plurality of power consumption values stored in the device of recipient type and thereby causes the device of recipient type to notify the bus of the selected power consumption value.

8. The device driver according to claim 6, wherein
   the device of recipient type stores a plurality of power consumption values to notify the bus of the plurality of power consumption values, and
   said electric power supply control section selects one of the plurality of power consumption values stored in the device of recipient type and thereby causes the device of recipient type to notify the bus of the selected power consumption value.

9. The device driver according to claim 3, wherein
   the device of recipient type stores power consumption values to notify the bus of the power consumption values so as to freely rewrite the power consumption values, and
   said electric power supply control section rewrites the power consumption values stored in the device of recipient type and thereby causes the device of recipient type to notify the bus of the rewritten power consumption values.

10. The device driver according to claim 6, wherein
    the device of recipient type stores power consumption values to notify the bus of the power consumption values so as to freely rewrite the power consumption values, and
    said electric power supply control section rewrites the power consumption values stored in the device of recipient type and thereby causes the device of recipient type to notify the bus of the rewritten power consumption values.

11. A device connected to a bus and supplied with electric power from the bus by notifying the bus of power consumption, said device comprising:
  a power control section responsive to receipt of a notice of power consumption identifying a consumption value to be used up by the device and that is excessive as compared with a supply capability of the bus indicated prior to the notice, for shifting said device to an operation state in which said device operates with reduced power consumption as compared with the excessive power consumption; and
  a power notice section responsive to a shift to the operation state, for notifying the bus of power consumption in the operation state.

12. A method of controlling power supplied to a device connected with a bus, comprising:
  determining remaining power supply capacity of the bus; and
  displaying a message indicative of the remaining power supply capacity of the bus prior to receiving a notice of power consumption from the device and supplying power via the bus with respect to a predetermined operation mode of the device, where the supplied power is maintained within the determined remaining power supply capacity of the bus.

13. A method of controlling power supplied to a device connected with a bus, comprising:
  determining remaining power supply capacity of the bus prior to receipt of a notice of power consumption identifying a consumption value to be used up by the device; and
  shifting an operation state of the device when the determined power supply capacity of the bus has exceeded a predetermined amount of power to reduce a current power consumption of the device.

14. A power supply control method, comprising:
  detecting an operation mode switch causing an operation change of a device;
  determining remaining power supply capacity of a bus supplying power to the device; and
  indicating whether a power consumption value to be used up by the device as required by said operation mode switch is within the determined remaining power supply capacity of the bus.

* * * * *

UNITED STATES PATENT AND TRADEMARK OFFICE
CERTIFICATE OF CORRECTION

PATENT NO. : 7,290,171 B2  
APPLICATION NO. : 10/291540  
DATED : October 30, 2007  
INVENTOR(S) : Makoto Saotome Page 1 of 1

It is certified that error appears in the above-identified patent and that said Letters Patent is hereby corrected as shown below:

IN THE CLAIMS SECTION

In column 9, line 37, delete "t" and replace with --to--

In column 10, line 8, please insert --driver-- between "device" and "according"

Signed and Sealed this

Sixth Day of May, 2008

JON W. DUDAS  
*Director of the United States Patent and Trademark Office*